United States Patent

Lo

[11] Patent Number: 5,282,913
[45] Date of Patent: Feb. 1, 1994

[54] METHOD FOR PRODUCING A CONNECTING TUBE INTERCONNECTING THE SHAFT AND THE HANDLE OF A RACKET

[76] Inventor: Kun-Nan Lo, No. 33, Hsiang-Ho Rd., Li-Lin Tsun, Tan-Tzu Hsiang, Taichung Hsien, Taiwan

[21] Appl. No.: 945,369

[22] Filed: Sep. 16, 1992

[51] Int. Cl.⁵ ............................................. B65H 81/00
[52] U.S. Cl. ............................... 156/185; 156/187; 156/191; 156/192; 156/245; 264/321
[58] Field of Search ............... 156/245, 191, 192, 185, 156/187; 264/46.9, 321

[56] References Cited

U.S. PATENT DOCUMENTS

| | | | |
|---|---|---|---|
| 3,755,037 | 8/1973 | Erwin et al. | 156/185 |
| 3,915,783 | 10/1975 | Goppel et al. | 156/245 |
| 3,930,920 | 1/1976 | Kicherer | 156/191 |
| 4,045,025 | 8/1977 | Staub et al. | 156/185 |
| 4,124,670 | 11/1978 | Cecka et al. | 156/245 |
| 4,128,963 | 12/1978 | Dano | 264/45.3 |
| 4,194,738 | 3/1980 | Inoue et al. | 156/79 |
| 4,294,787 | 10/1981 | Lo | 264/46.6 |
| 4,983,242 | 1/1991 | Reed | 156/187 |
| 5,175,919 | 1/1993 | Lo | 156/191 |

FOREIGN PATENT DOCUMENTS

| | | | |
|---|---|---|---|
| 2217149 | 9/1974 | France | 264/46.9 |
| 448486 | 6/1936 | United Kingdom | 264/46.9 |

*Primary Examiner*—Allan R. Kuhns
*Attorney, Agent, or Firm*—Jacobson, Price, Holman & Stern

[57] ABSTRACT

A method of producing a connecting tube that interconnects the shaft and the handle of a racket includes the steps of performing two foamed preforms which cooperatively form a foamed layer; placing the two foamed preforms around an internal impregnated fiber wall of the connecting tube; wrapping predetermined layers of impregnated fibers around the two preforms to form an external impregnated fiber wall; and heating the internal and external impregnated fiber walls and the preforms in a mold to allow the internal and external impregnated fiber walls and the preforms to connect integrally.

1 Claim, 5 Drawing Sheets

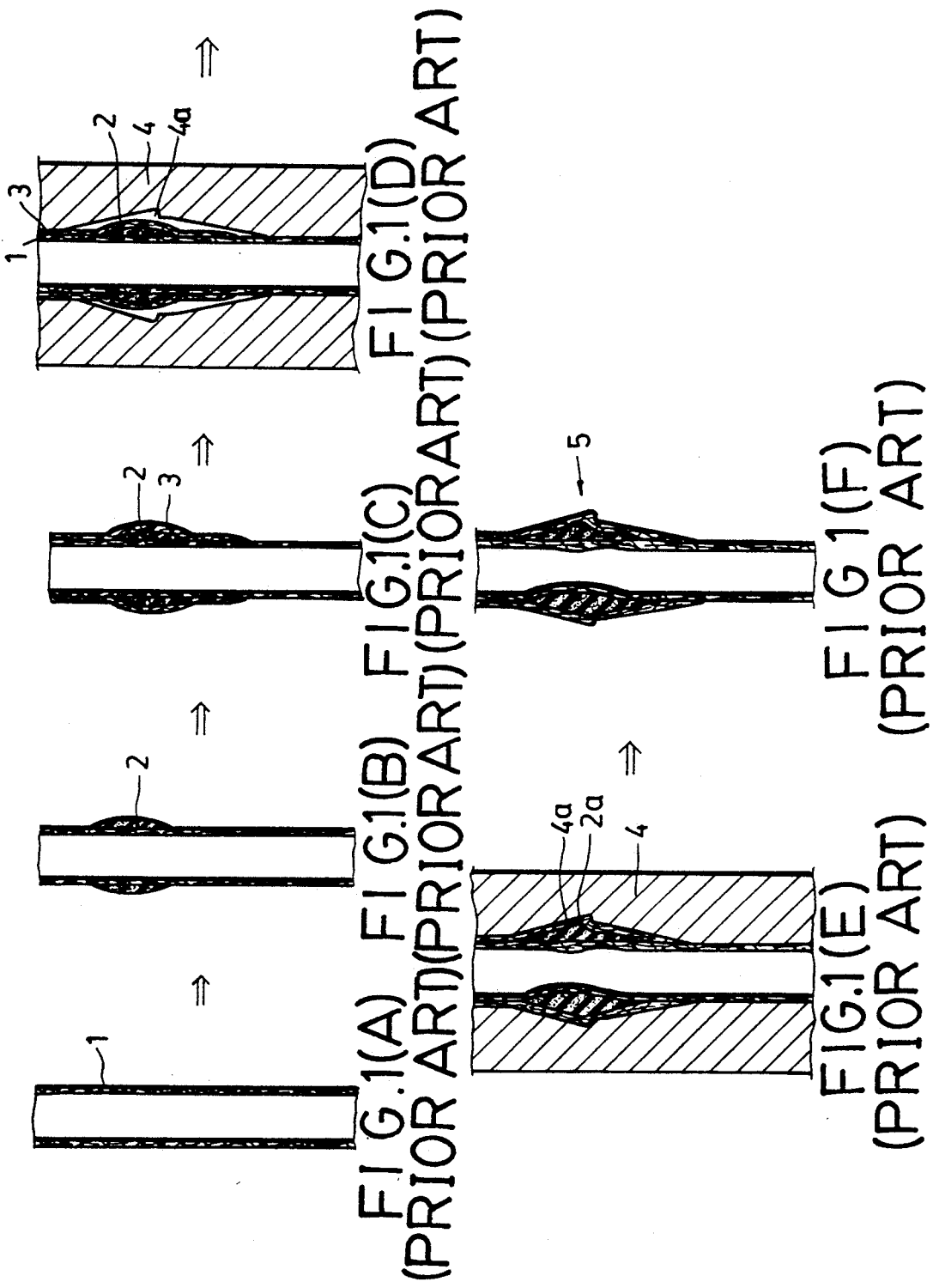

METHOD FOR PRODUCING A CONNECTING TUBE INTERCONNECTING THE SHAFT AND THE HANDLE OF A RACKET

BACKGROUND OF THE INVENTION

1. Field of the Invention

This invention relates a method for producing a connecting tube that interconnects the shaft and the handle of a racket, more particularly to a method for producing a connecting tube that interconnects the shaft and the handle of the racket, which method can reduce the defective ratio of the connecting tube.

2. Description of the Related Art

Rackets, such as badminton rackets, tennis rackets, etc., have connecting tubes which interconnect the shafts and the handles of the rackets. The connecting tubes are manufactured in the following manner. FIGS. 1(A) to 1(F) are schematic views illustrating a conventional method of producing the connecting tube which interconnects the shaft and the handle of the racket. Impregnated fiber laminates are rolled into a tubular internal wall (1), as shown in FIG. 1(A). A foamable material (2), which has not expanded, is provided around the tubular internal wall (1) at a predetermined position, as shown in FIG. 1(B). A predetermined number of impregnated fiber laminates (3) are then wrapped around the foamable material (2) in order to form an external wall, as shown in FIG. 1(C). The wrapped tubular internal wall (1) is disposed in a mold (4) with a mold cavity (4a), as shown in FIG. 1(D). The mold (4) is heated in order to allow the foamable material (2) to expand into a rigid foam (2a) and depress the impregnated fiber laminates (3) to fill the mold cavity (4a) in order to form an external wall, as shown in FIG. 1(E). A connecting tube 5 is thus obtained, as shown in FIG. 1(F).

However, since it is difficult to control the expanding ratio of the unexpanded foamable material (2) and the amount of the unexpanded foamable material (2) around the tubular internal wall (1), the foamable material (2) will depress the tubular internal wall (1) inwardly during the heating process, thereby causing the tubular internal wall (1) to deform irregularly and causing the thickness (S) of the tubular internal wall (1) and the external wall to be uneven, as best illustrated in FIGS. 1(F), 2(A) and 2(B). This will reduce the strength of the racket and increase the defective ratio of the racket.

SUMMARY OF THE INVENTION

It is therefore a main object of this invention to provide a method for producing a connecting tube interconnecting the shaft and the handle of a racket, which method can provide the internal wall of the connecting tube with a regular shape and can further provide the internal wall and the external wall of the connecting tube with uniform thickness.

Accordingly, a method of producing a connecting tube that interconnects the shaft and the handle of a racket of this invention includes the steps of:
preforming two foamed preforms which cooperatively form a foamed layer;
placing the two foamed preforms around an internal impregnated fiber wall of the connecting tube;
wrapping predetermined layers of impregnated fibers around the two preforms to form an external impregnated fiber wall; and
heating the internal and external impregnated fiber walls and the preforms in a mold to allow the internal and external impregnated fiber walls and the preforms to connect integrally.

Since the foamed layer will not expand to depress the internal and external walls of the connecting tube during the heating process, the internal and external walls of the connecting tube will not deform and thus the thickness of the same can be uniformly controlled.

BRIEF DESCRIPTION OF THE DRAWINGS

Other features and advantages of this invention will become apparent in the following detailed description of a preferred embodiment of this invention with reference to the accompanying drawings, in which:

FIGS. 1(A) to 1(F) are schematic views illustrating a conventional method of producing a connecting tube for interconnecting the shaft and the handle of a racket;

DETAILED DESCRIPTION OF THE PREFERRED EMBODIMENT

Figure 5:
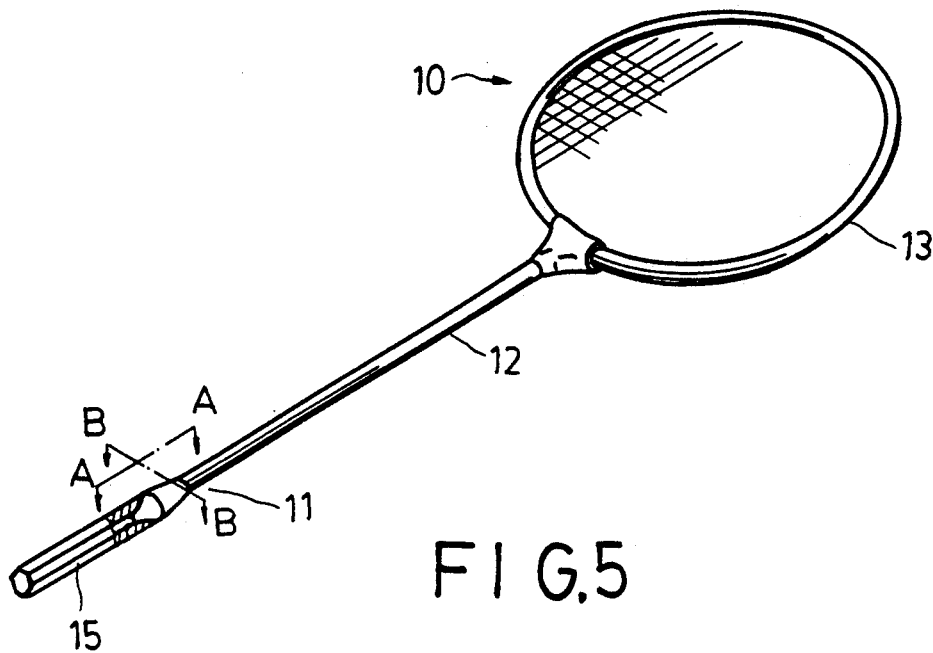
FIG. 5 is a perspective view of a preferred embodiment of a badminton racket of this invention.
Figure 6:
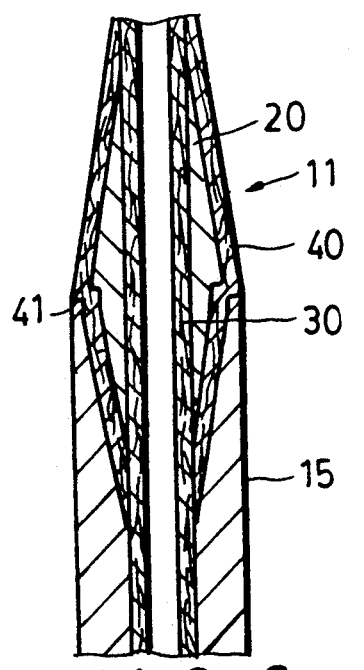
FIG. 6 is a sectional view of the connecting tube of this invention taken along the line A—A.
Figure 7:
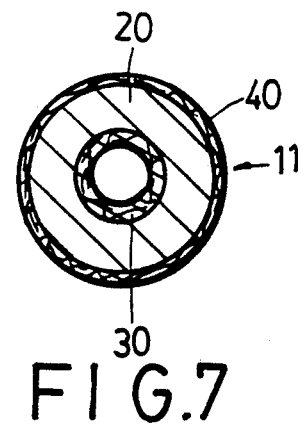
FIG. 7 is a cross-sectional view of the connecting tube of this invention taken along the line B—B.

FIG. 5 shows a perspective view of a preferred embodiment of a badminton racket 10 of this invention. The badminton racket 10 includes a frame 13 having a shaft 12 connected thereto, a handle 15 and a connecting tube 11 interconnecting the shaft 12 and the handle 15. The two ends of the connecting tube 11 are connected integrally to the shaft 12 and the handle 15 of the badminton racket 10. The connecting tube 11 includes a tubular internal impregnated fiber wall 30, an external impregnated fiber wall 40 and a formed layer 20 formed integrally between the internal and external impregnated fiber walls, 30 and 40. The outer diameter of the external impregnated fiber wall 40 is gradually increased from two ends to the intermediate portion thereof. An annular shoulder portion 41 is formed at the intermediate portion of the external impregnated wall 40, as best illustrated in FIG. 6.

Figure 2A:
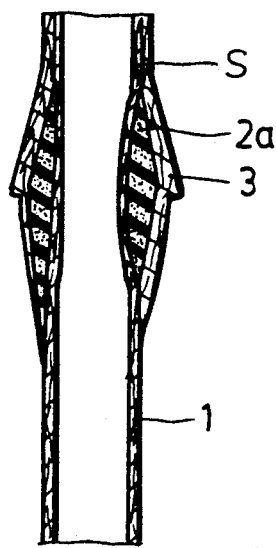
FIG. 2(A) is a sectional view of the conventional connecting tube.
Figure 2B:
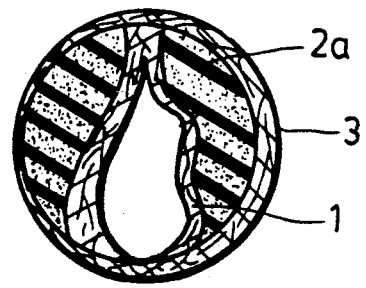
FIG. 2(B) is a cross-sectional view of the conventional connecting tube.
Figure 3:
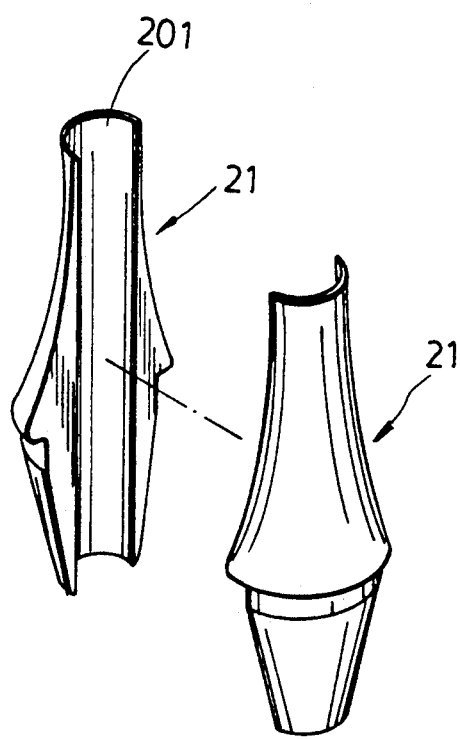
FIG. 3 is a perspective view of two foamed preforms of the connecting tube of this invention.

FIGS. 4(A) to 4(E) are schematic views illustrating the method of producing the connecting tube 11 of this invention. Two foamed preforms 21 are formed by means of preforming a foamable material. The foamed preforms 21 cooperatively form the foamed layer 20. The foamed layer 21 has an axial through hole 201 in which the tubular internal impregnated fiber wall 30 is to be received. The external surface of the foamed layer 21 has an outline which corresponds to that of the external impregnated fiber wall 40, as best illustrated in FIG. 3.

Figure 4A:
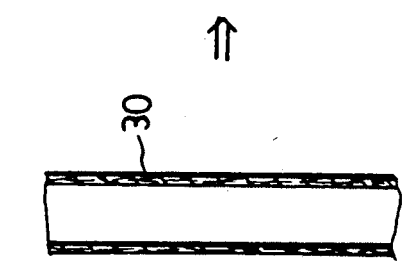
FIGS. 4(A) to 4(E) are schematic view illustrating a preferred embodiment of a method of producing a connecting tube for interconnecting the shaft and the handle of a badminton racket of this invention.
Figure 4B:
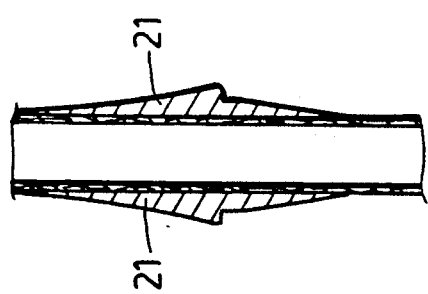
Figure 4C:
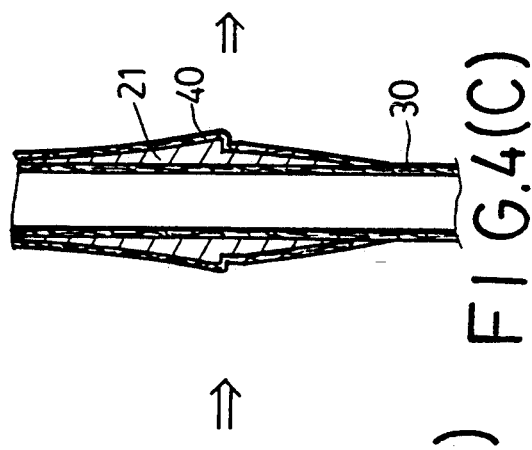
Figure 4D:
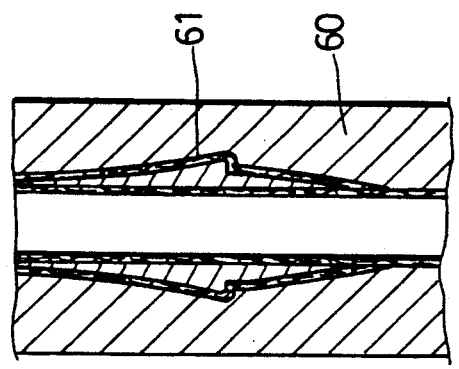
Figure 4E:
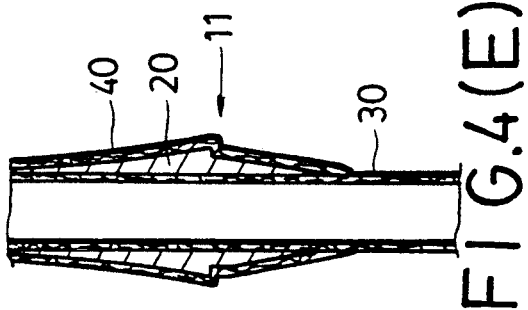

Referring to FIG. 4(A), the tubular internal impregnated fiber wall 30 is made of impregnated carbon fiber laminates as in the prior art. The two foamed preforms 21 are placed oppositely around the internal impregnated fiber wall 30, as best illustrated in FIG. 4(B). Predetermined layers of impregnated carbon fibers are then wrapped around the two foamed preforms 21 to form the external impregnated fiber wall 40. A green connecting tube is thus formed, as shown in FIG. 4(C). The green connecting tube is then heated in a mold 60 with a mold cavity 61 which has an outline matching with that of the external impregnated fiber wall 40 in order to allow the internal and the external impregnated fiber walls (30, 40) to harden and to connect integrally with the two foamed preforms 21, as shown in FIG. 4(D). A connecting tube 11 with a regular shape and uniform structure is thus obtained, as best illustrated in FIG. 4(E).

It is noted that since the foamed layer 20 will not expand to depress the internal and external impregnated fiber walls (30, 40) of the connecting tube 11 during the heating process, the internal and external impregnated fiber walls (30, 40) of the connecting tube 11 will not deform and thus, the thickness of the same can be uniformly controlled.

With this invention thus explained, it is apparent that numerous modifications and variations can be made without departing from the scope and spirit of this invention. It is therefore intended that this invention be limited only as indicated in the appended claims.

I claim:

1. A method for producing a connecting tube that interconnects a shaft of a racket and a handle of the racket, said connecting tube having an external impregnated fiber wall, an internal impregnated fiber wall spaced from said external impregnated fiber wall, and a foamed layer integrally formed with and filling a space between said external and internal impregnated fiber walls, said method comprising the steps of:

preforming two foamed preforms which cooperatively form said foamed layer;

placing said two foamed preforms around said internal impregnated fiber wall;

wrapping layers of impregnated fibers around said two foamed preforms to form said external impregnated fiber wall; and heating said internal and external impregnated fiber walls and said foamed preforms in a mold to allow said internal and external impregnated fiber walls and said foamed preforms to connect integrally.

* * * * *